Jan. 20, 1959  G. BROUSSAUD  2,870,444
RADIATING SYSTEMS
Filed Nov. 15, 1955
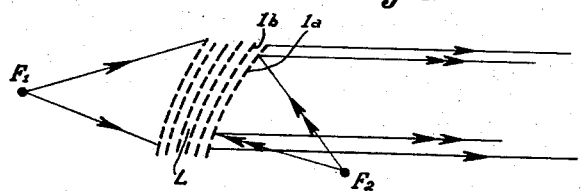
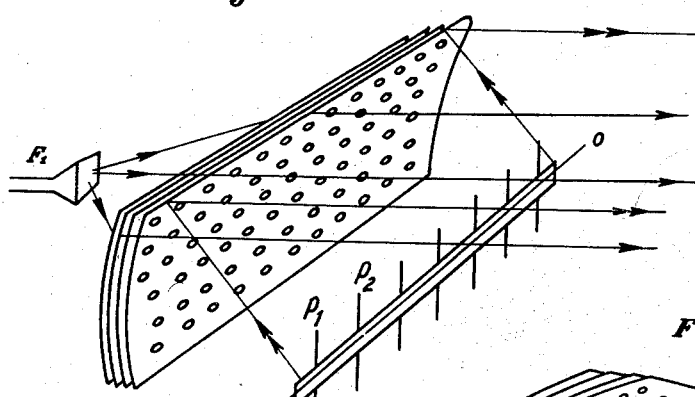
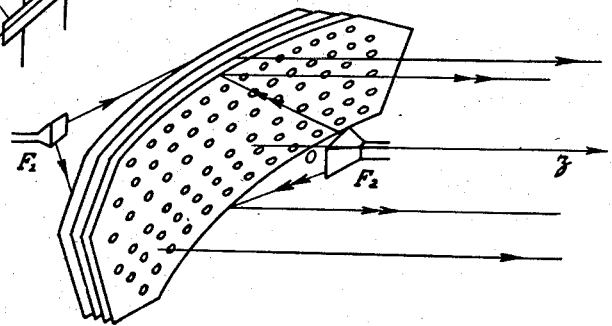
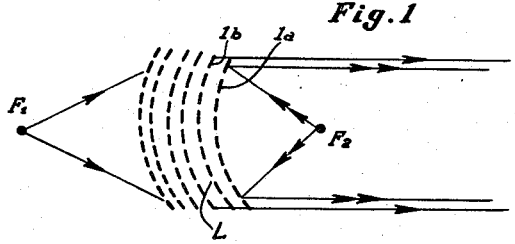

United States Patent Office

2,870,444
Patented Jan. 20, 1959

2,870,444

RADIATING SYSTEMS

Georges Broussaud, Paris, France, assignor to Compagnie Generale de Telegraphie Sans Fil, a corporation of France Application November 15, 1955, Serial No. 546,899

Claims priority, application France November 18, 1954

6 Claims. (Cl. 343—909)

The present invention relates to aerials for radiating energy originating from two radiation sources operating simultaneously.

It is frequently necessary, especially in the technique of detection of mobile targets, to be able to send two signals simultaneously, one serving, for instance, for search, the other for identification of the friend or foe. In order to reduce the bulk of the equipment, a single antenna is generally used. A system is known, for instance, comprising an exciter horn, located at the focus of an aerial in the form of a paraboloid of revolution, constituting the first source of radiation, and two dipoles positioned on either side of said horn, forming the second radiation source. However, the positioning of both sources on the same side of the aerial involves certain disadvantages. Thus, the proper radiation pattern of the dipoles is distorted, the dipoles are not readily matched and the efficiency of transmission is therefore reduced. Moreover, by their very presence, they will interfere with the horn radiation, although this latter disadvantage may be attenuated by using certain structures in which a portion only of the surface of the paraboloid is utilized. The adjustment of the exciter elements, however, remains difficult.

These disadvantages are eliminated in the present invention. It is an object of the latter to provide an aerial capable of radiating, or receiving simultaneously, two waves of different frequencies, with high efficiency and without any disturbing effect from one radiation on the other.

The aerial according to the invention comprises essentially a combination of two sources of radiation, positioned respectively on either side of a structure of superposed, spaced metal plates, suitably curved and having holes therein, said structures serving respectively as a lens and as a mirror for said two sources. The structure acts, with regard to the first source located on the convex side, as an electro-magnetic lens at the focus of which said source is positioned, while, with regard to the second source, located on the concave side, the structure acts as a mirror formed by the plate nearest to said source and reflects the waves radiated by said second source located at its focus.

To secure transparency with respect to the radiations emanating from the first source, the invention avails itself of the properties of electromagnetic lenses made up of structures comprising perforated plates, such as described in the U. S. Patent 2,763,860. For certain bands of wavelengths, such structures behave like lenses and for wavelengths outside these bands they behave as mirrors, in so far as their concave side is concerned. If said plates are suitably curved, this mirror is focused. In particular, if such plates are given the shape of paraboloids of revolution, a highly efficient reflection is obtained by placing the corresponding source at the focus of the meridian.

As previously mentioned, the plate closest to one of the sources acts as a reflector with respect to the waves radiated by this source. It has been established, on the one hand, that deflection is almost unaffected by the perforations in the plate. On the other hand, it has been found that, although curved, the structure may have an equally good transmission factor, even for considerable angles of incidents, if built as disclosed in the above mentioned patent application.

The invention will be better understood with the aid of the appended description and with reference to the annexed drawings, wherein:

Figure 1 represents a sectional diagram of a system according to the invention.

Figure 2 is a modified embodiment thereof illustrating a so-called "off-set" arrangement.

Figure 3 is a perspective view of a system similar to the system of Fig. 1.

Figure 4 is a perspective view of an alternative "off-set" arrangement.

In Fig. 1, the assembly L comprises a stack of spaced parallel plates $1a$, $1b$, etc., having holes therein and shaped as paraboloids or a parabolic cylinder. The centers of the holes of each plate form a square mesh pattern, the sides of the meshes being smaller than the shortest wavelength to be transmitted, as described in the above mentioned patents. The radiating sources $F_1$ and $F_2$ are located on opposite sides of the assembly L, source $F_2$, which operates by reflection, being placed on the concave side, while source $F_1$, acting by transmission, is located on the convex side of this structure. These sources comprise suitable exciters such as horns, dipoles, etc., respectively fed from suitable high frequency oscillators. The waves radiated by the sources $F_1$ and $F_2$ may be amplitude, frequency or pulse modulated, but their carrier frequencies must be substantially different, so as to avoid any interferences between the radiated waves. The highest frequency band will be transmitted by the source $F_1$ and the lowest by the source $F_2$. The paths of the radiations issuing from these sources are illustrated diagrammatically by the arrows in the figure. The device represented may be used both for transmission and for reception. In this case, the respective total antenna passbands, according as the antenna is considered as a mirror or as a lens, should not overlap. In practice, such a result is obtained by separating the respective carrier frequencies by at least one octave.

Figure 2 represents a modification of the device illustrating a so-called "off-set" arrangement of the structure. In this arrangement, the focus of the mirror where the source $F_2$ is placed is lowered below the radiation lobe of the first source $F_1$ located at the focus of the lens.

This arrangement is possible because of the fact that the position of the lens focus can be varied by the arrangement of the holes in the plates constituting the aerial. The focus of the mirror is, on the contrary, determined only by the geometry of said plates.

Figure 3 is a perspective view of an actual embodiment of the system in Figure 1. The perforated plates are elements of a paraboloid of revolution with a common axis $o$—$z$. The two radiating sources $F_1$ and $F_2$ comprise two horns respectively located at the ends of two waveguides.

In Figure 4, the plates form the elements of paraboloid cylinders having a common focal axis $o$—$z$. It is easier to bend plates into a parabolic cylindrical shape than into a paraboloid, and this is an advantage of this embodiment. Doublets $P_1$, $P_2$ etc., excited from a coaxial line are, for instance, located along the focal axis. The second radiating source comprises horn $F_1$. The respective frequencies will be, for instance, 1000 and 3000 mc./s.

It is of course to be understood that the invention is not limited to the embodiments illustrated and described, these being given by way of example only. In particular, each plate may consist of several plane elements so assembled as to constitute a polyhedral structure, which considerably facilitates the construction of the plates.

It will further be understood that, although above examples refer to a transmitting aerial, receiving antennas can be built on the same principles, without departing from the scope of the invention.

What I claim is:

1. A radiating system for radiating two ultra high frequency carrier waves having respectively a first frequency, and a second frequency lower than said first frequency, comprising in combination: a plurality of parallel spaced metallic plates comprising two end plates, each plate having a concave and a convex side, each side having a focus and a plurality of discrete holes spaced apart from each other and having dimensions smaller than the shortest of said waves; first radiating means positioned at the focus of the convex side of one end plate for radiating the wave having said first frequency; and second radiating means located at the focus of the concave side of the other end plate for radiating said other carrier wave.

2. A device according to claim 1, wherein said perforated metal plates are curved to form paraboloids of revolution.

3. A device according to claim 2, wherein the first source is offset with respect to the axis of the meridian parabola of said paraboloids.

4. A device according to claim 1, wherein said metal plates are curved to form parabolic cylinders, said second radiating means comprising electric dipoles and a transmission line feeding said dipoles positioned along the axis of said cylinders.

5. A device according to claim 2, wherein each of said metal plates is constituted by a series of plane elements, assembled to form a polyhedral surface.

6. A device according to claim 4, wherein the first source is located outside the plane of symmetry of the parabolic cylinders.

References Cited in the file of this patent
UNITED STATES PATENTS 2,636,125     Southworth _____ Apr. 21, 1953